(12) United States Patent
Shepard et al.

(10) Patent No.: US 7,864,700 B2
(45) Date of Patent: Jan. 4, 2011

(54) DISCOVERING AND MERGING NETWORK INFORMATION

(75) Inventors: David L. Shepard, Marlborough, MA (US); Bradley S. Carey, Wrentham, MA (US); Lawrence A. Stabile, Cochituate, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1170 days.

(21) Appl. No.: 10/876,367

(22) Filed: Jun. 23, 2004

(65) Prior Publication Data

US 2005/0094573 A1      May 5, 2005

Related U.S. Application Data

(60) Provisional application No. 60/480,837, filed on Jun. 23, 2003.

(51) Int. Cl.
*H04L 12/28* (2006.01)
*G06F 15/173* (2006.01)

(52) U.S. Cl. .............. 370/254; 370/220; 370/258; 370/465; 709/222; 709/223; 709/249; 709/250

(58) Field of Classification Search ........... 370/217, 370/254, 258, 465, 220; 709/220, 221, 222, 709/223, 249, 250
See application file for complete search history.

(56) References Cited

U.S. PATENT DOCUMENTS

| | | | |
|---|---|---|---|
| 6,295,527 B1 * | 9/2001 | McCormack et al. ........ 707/3 |
| 6,321,258 B1 | 11/2001 | Stollfus et al. ............ 709/220 |
| 6,532,241 B1 * | 3/2003 | Ferguson et al. ............ 370/469 |
| 6,601,093 B1 * | 7/2003 | Peters ........................ 709/220 |
| 6,985,941 B2 * | 1/2006 | Schweitzer et al. ......... 709/224 |
| 7,069,343 B2 * | 6/2006 | Goringe et al. ............. 709/249 |
| 7,203,175 B2 * | 4/2007 | Thubert et al. ............. 370/254 |
| 7,240,364 B1 * | 7/2007 | Branscomb et al. ........... 726/9 |
| 7,266,084 B2 * | 9/2007 | Suonsivu et al. ............ 370/252 |
| 7,337,184 B1 * | 2/2008 | Or et al. ................... 707/102 |
| 2003/0041238 A1 * | 2/2003 | French et al. .............. 713/153 |
| 2003/0105881 A1 * | 6/2003 | Symons et al. ............. 709/249 |
| 2003/0154199 A1 | 8/2003 | Thomas et al. .............. 707/10 |
| 2004/0151128 A1 * | 8/2004 | Wechter et al. ............ 370/254 |
| 2004/0186903 A1 * | 9/2004 | Lambertz .................. 709/224 |
| 2004/0221041 A1 * | 11/2004 | Tabbara .................... 709/227 |

OTHER PUBLICATIONS

International Search Report of PCT/US04/20119; mailed on Jun. 23, 2003.

* cited by examiner

*Primary Examiner*—Pankaj Kumar
*Assistant Examiner*—Lonnie Sweet
(74) *Attorney, Agent, or Firm*—Pillsbury Winthrop Shaw Pittman LLP (57) ABSTRACT

A method of merging a list of newly found network elements and a list of previously known network elements includes arranging the newly found network elements in a hierarchical structure, and determining one or more device matches between each network device in the list of newly found network elements and one or more network devices in the list of previously known network elements. The method further includes, for each of the one or more device matches, determining one or more network element matches between the newly found network element and the corresponding previously stored network device. The method also includes updating the previously found network device corresponding to each of the one or more device matches with the corresponding newly found network device.

32 Claims, 2 Drawing Sheets

DISCOVERING AND MERGING NETWORK INFORMATION

CROSS-REFERENCE TO RELATED APPLICATIONS

This application claims benefit U.S. Provisional Patent Application Ser. No. 60/480,837, filed Jun. 23, 2003.

TECHNICAL FIELD

This invention relates generally to monitoring and managing networks.

BACKGROUND

Electrical devices connected together through a network can communicate with one other, even if some of the devices are not in close proximity to the other devices. Some networks connect electrical devices in a small area, such as a single room or building, while other networks connect electrical devices in a much larger area, such as different parts of a country or the world. Examples of networked electrical devices include routers, bridges, gateways, servers, and individual computer workstations.

In order to keep a network functioning properly and to deal efficiently with network problems, a network manager periodically gathers information about all of the devices connected to the network, and maintains that information, in, e.g., a database. As used herein, the term "discovery" refers to the process of gathering such network information, and "discovery system" refers to the collection of hardware components and associated software used in the discovery process. For each network discovery, the network manager must combine the newly gathered information with the previously known network information stored in the database. As used herein, the term "merge" refers to the process of combining new network information with the previously known network information.

Several events can change the information associated with a network (referred to herein as network or device configuration). For example, rebooting one or more of the electrical devices in the network can change the configuration of those devices. Also, changing one or more components (e.g., an interface card) of a network device, or updating the software in the network device can change the configuration of the device.

The network configuration may change to modify network connectivity, i.e., to reroute data paths to/from a network device. This case typically involves modifying the network device in some respect, without adding or removing a network device. Network configuration may also change to increase network capacity, which typically involves adding a new network device.

When combining newly gathered network information with previously known network information, it is sometimes difficult to match corresponding devices that have different configuration data. For example, replacing several interface cards in a router may result in significantly different configuration data associated with the router (e.g., different IP addresses, different unique device identification numbers, etc.). Even though the merge should indicate the router with the new interface cards is simply an updated version of the previously known router, the changes can make that determination ambiguous. In other words, it may be difficult to distinguish between a modified network device and an entirely new network device.

SUMMARY OF THE INVENTION

In one aspect, a method of merging a list of newly found network elements and a list of previously known network elements includes arranging the newly found network elements and previously known network elements in a hierarchical structure, and determining one or more device matches between each network device in the list of newly found network elements and one or more network devices in the list of previously known network elements. The method further includes, for each of the one or more device matches, determining one or more network element matches between the newly found network element and the corresponding previously stored network device. The method also includes updating the previously found network device corresponding to each of the one or more device matches with the corresponding newly found network device.

In one embodiment, the method further includes comparing, for each of the one or more device matches, an address cloud associated with the newly found network device with an address cloud associated with the matching network device from the list of previously known network elements, so as to increase a level of confidence of the one or more device matches. Comparing an address cloud associated with the newly found network device with an address cloud associated with the matching network device from the list of previously known network devices includes comparing physical addresses and IP addresses of the network devices from the list of newly found network elements and the list of previously known network elements.

In another embodiment, determining one or more network element matches further includes comparing physical addresses of corresponding interface elements for devices from the list of newly found network elements and the list of previously known network elements.

In another embodiment, determining one or more device matches further includes searching a configuration database to determine whether a system name associated with the network device from the list of newly found network elements matches a system name associated with a network device from the previously known network elements.

In another embodiment, determining one or more device matches further includes searching a configuration database to determine whether an IP address associated with a network device from the list of newly found network elements matches an IP address associated with a network device from the previously known network elements.

In another embodiment, determining one or more device matches further includes searching a configuration database to determine whether a unique device identification number associated with the network device from the list of newly found network elements matches a unique device identification number associated with a network device from the previously known network elements.

In another embodiment, determining one or more network element matches further includes comparing NmsKey data, then comparing physical address data, then comparing Mib indices, for one or more network interface elements of the newly found and previously known devices associated with the device match.

In another embodiment, comparing NmsKey data includes searching a configuration database to determine whether the NmsKey data for the device from the list of newly found network elements matches the NmsKey data for a network device from the list of previously known network elements.

In another embodiment, comparing physical address data further includes searching a configuration database to determine whether the physical address data for the device from the list of newly found network elements matches the physical address data for a network device from the list of previously known network elements.

In another embodiment, comparing Mib indices further includes searching a configuration database to determine whether the Mib indices for the device from the list of newly found network elements match the Mib indices for a network device from the list of previously known network elements.

In another embodiment, arranging the newly found network elements in a hierarchical structure further includes eliminating duplicate records of the newly found network elements.

In another aspect, a method of merging a list of newly found network elements and a list of previously known network elements includes determining whether configuration data associated with each network device in the list of newly found network elements corresponds, at least partially, to a network device in the list of previously known network elements so as to produce a device match. The method further includes, for each device match, determining whether one or more logical links of the newly found network element match corresponding network links of the previously known network element, and if a match of the one or more logical links cannot be determined, comparing physical addresses of the interface components of the network device in the list of newly found network elements to physical addresses of the interface components of the network device in the list of previously known network elements.

In another aspect, a method of determining whether a newly found network device matches one or more devices from a list of previously known network devices includes comparing one or more device attributes of the newly found network device to corresponding device attributes of network devices from the list of previously known network devices. The method further includes, if at least some of the device attributes of the newly found network device match corresponding device attributes of network devices from the list of previously known network devices, comparing an address cloud associated with the newly found network device with an address cloud associated with the matching network device from the list of previously known network devices.

DETAILED DESCRIPTION

The discovery system of the described embodiment evaluates a wide range of network device attributes in a specific order to provide a high level of confidence of matches between newly gathered network information and previously known network information. The described embodiment also assembles network discovery data in a hierarchical structure to reduce or eliminate duplicate device records. Further, the particular hierarchical structure of this embodiment facilitates the specific order of the network device attribute evaluation. U.S. patent application Ser. No. 10/223,670, filed Aug. 19, 2002 (the '670 application; hereby incorporated by reference) describes techniques for discovering new network information, and merging this newly found network information into a database of previously-known information. The following description sets forth embodiments that improve upon the techniques in the '670 application. In general, the described embodiment adds information about the network elements to the merge evaluation process, in particular, utilizing the addresses of interfaces on network devices.

Figure 1:
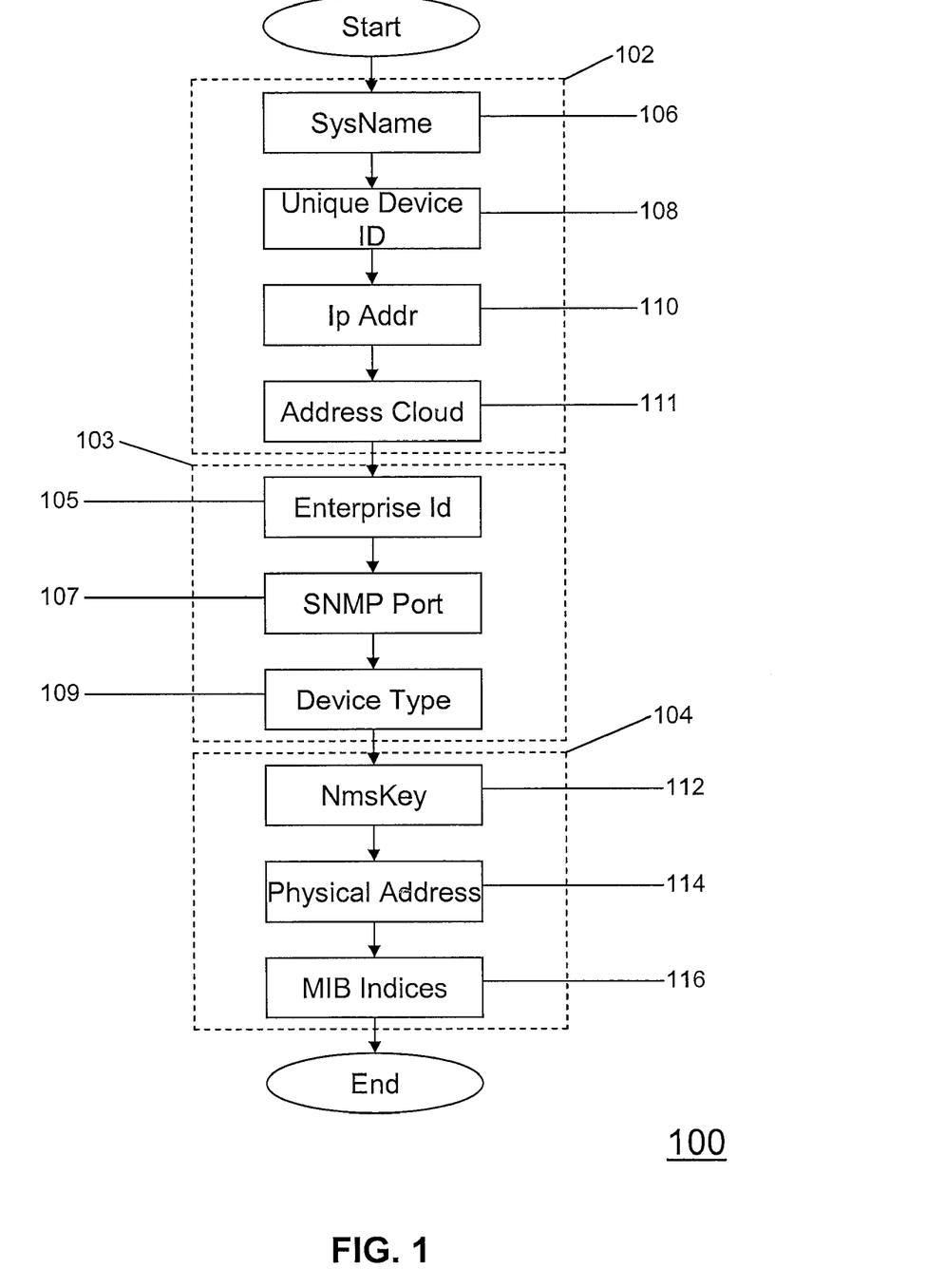
FIG. 1 is a flow diagram showing the merge evaluation process of the described embodiment.

FIG. 1 is a flow diagram showing the merge evaluation process 100 of this embodiment of a discovery system. The discovery system is an example of the use of "model-driven recognition." Each time the discovery system performs a network discovery operation, the discovery system produces information that represents a set of network devices. The specific information associated with each network device includes the system name (SysName) associated with the device, a unique device identification number (UniqueDeviceID) associated with the device, and the IP address (IPAddr) associated with the device. The discovery system uses the match hierarchy of the merge evaluation process 100 to determine if any (or all) of the newly-discovered devices match previously-discovered devices, configuration data for which is stored in a configuration database.

The discovery system uses the two match hierarchies to compare the input with the previously known elements using an efficient top down tree walk, thus guaranteeing that a comparison will proceed in a number of steps that is approximately logarithmic with respect to the number of elements (i.e., number of steps approximately =Log [number of elements]).

The merge evaluation process 100 begins with a device match evaluation 102, followed by an agent match evaluation 103, then an element match evaluation 104. The discovery system executes the merge evaluation process 100 for each device that results from a network discovery (i.e., a potentially new device). In general, the device match evaluation 102 evaluates a combination of attributes associated with the device. If all of those attributes of the newly discovered device exactly match all of the corresponding attributes of a previously known device in the database, the newly discovered device is deemed to match the previously known device. If none of the attributes of the newly discovered device match a previously known device, the newly discovered device is deemed a new device. If, however, the newly discovered device matches only some of the attributes of a previously known device, the newly discovered device may be a previously known device, and more evaluation is required. The device match evaluation 102 evaluates the "address cloud" of the newly discovered device with the address cloud of potentially matching previously known devices. The address cloud of a network device comprises an unordered set of all of the physical addresses and IP addresses associated with that device. If at least ⅔ of the address cloud components are the same, the device match evaluation 102 deems the newly discovered network device to be the same as the previously known device with the same address cloud.

In the described embodiment, the device match evaluation 102 includes a SysName evaluation 106, a UniqueDeviceId evaluation 108, and an IpAddress evaluation 110. If fewer than all of these attributes of a newly discovered device match a previously known device, or if all of these attributes of a newly discovered device match more than one previously known device, the device match evaluation performs an address cloud evaluation 111.

The SysName evaluation 106 searches the database to determine whether the system name of the potentially new device matches the device name of any previously known devices. The system name of a device is a descriptive name assigned to that device, and provides some insight as to the device function. Examples of system names include "CoreRouter" and "BostonGateway."

The UniqueDevice Id evaluation 108 searches the database to determine whether the unique device identification number of the new device matches the unique device identification number of any previously known devices. The unique device identification number is a hardware identifier, e.g., a chassis identification number for the network device. An example of such a unique device identification number is 01:02:03:04.

The IpAddress evaluation 110 searches the database to determine whether the IP address of the new device matches the IP address of any previously known device. The IP address of the device is a number (e.g., 01.02.03.04) that is assigned to the device. Although the IP address of the network device can be reconfigured, IP addresses tend to remain with a particular device.

The address cloud evaluation 111 searches the database to determine whether the address cloud of the new device matches the address cloud (or at least ⅔ of the address cloud components) of any previously known device. As described above, the address cloud of a network device includes the unordered set of physical addresses and IP addresses of all interfaces of that device. The address cloud evaluation 111 evaluates the physical addresses first, followed by the IP addresses, because the physical addresses are more reliable. Some network devices do not have individual IP addresses for each interface, whereas each interface will have a physical address. The physical address is a unique number assigned to the interface element (e.g., to an interface card) by the manufacturer, and is associated with the interface element itself, and not to the link associated with the interface element. If the device match evaluation 104 invokes the address cloud evaluation 111 for a newly discovered network device, the discovery system informs the user (by updating the discover log) that the particular device is not a certain match with the previously known device, and that the interface information was used to increase the confidence of the match.

Although the device match evaluation of the described embodiment evaluates only three device attributes (SysName, UniqueDevice Id and IpAddress), other embodiments may evaluate other device attributes known in the art, with or without the device attributes described herein.

Through the SysName evaluation 106, the UniqueDevice Id evaluation 108, and the IpAddress evaluation 110 and address cloud evaluation, the device match evaluation 104 either matches a newly discovered device with a previously known device, or deems the newly discovered device to be a new device not previously known. If matched as a previously known device, the system then evaluates the network device with the element match evaluation 104, which evaluates the device with respect to the various network links to the device (i.e., links with respect to elements within the device). The element match evaluation 104 differs from the address cloud evaluation 111 in that the element match evaluation 104 evaluates the logical links to other network elements, whereas the address cloud evaluation 111 evaluates the interface ports themselves on the device.

Prior to element match evaluation, the system performs an agent match evaluation 103, including EnterpriseId evaluation 105, SNMPport evaluation 107, and DeviceType evaluation 109. If the agent match evaluation 103 determines that the newly found agent matches a previously known agent, the system moves on to element match evaluation 104; otherwise the system declares the newly found agent to be a new agent.

The element match evaluation 104 includes an NmsKey evaluation 112, a physical address evaluation 114, and a Mib index evaluation 116. There is a deviceType evaluation performed in concert with the Mib index evaluation. Neither one nor the other is sufficient by itself. The NmsKey evaluation 112 searches the database to determine whether the NmsKey for each link to the device matches the NmsKey for a link on a previously known device. The NmsKey is a logical identifier describing a logical link, and is scoped by device (i.e., NmsKeys must be unique within a device, but not across devices). The NmsKey is generally populated with an interface description (i.e. ifDescr) and this interface description may be set in two possible ways: The manufacturer may set it based typically on some physical property of the interface (shelf, interface card, etc), or the user may set it as the user sees fit. The philosophy behind NmsKey (i.e. interface description) matching is that users may want to take a "wire" or "usage" view of the network element. Call it, if you will, its logical identity. For example, a given wire emerging from a port on a router may represent the "Boston-to-NY-Link." If the associated interface card is changed, or the wire is moved to another port, the user would still like to retain the same logical view that this is the "Boston-to-NY-Link". An NmsKey match, even on a different port, suggests that this interface shares the same logical link as the previously labeled interface.

In addition to evaluating logical links from network devices, the NmsKey evaluation 112 may also encompass a secondary key called VirtualId. VirtualId is used to resolves virtual interfaces passing through a single device port (such as frame-relays, ATM, and other packet based channels) in situations where the combination of NmsKey and the physical address (described below) may not be unique.

If the NmsKey evaluation 112 fails to provide an element match for the newly discovered element, or if the NmsKey evaluation finds more than one previously known element with the same logical identifier (i.e., NmsKey) implying that the logical identifier is not unique, the element match evaluation 104 tries to find a match on the physical addresses of the interface elements of the device. Physical addresses for the interface elements are hardware based addresses assigned by hardware manufacturers when the interface card is built and are unique by definition. The physical address evaluation 114 searches the database to determine whether the physical addresses of the interface elements from the newly discovered element match any of the previously known element. The inherent uniqueness of a physical address makes the likelihood of finding more than one network element with the same physical address very low.

If the physical address evaluation 104 fails to find a match on physical addresses of the interface elements of the newly discovered device, the element match evaluation 104 tries to find a match based on management information base (Mib) indices. The Mib Index evaluation searches the database to determine whether the Mib indices for the interface elements of the newly discovered device match the Mib indices of previously known devices. As described above, a DeviceType evaluation 109 is used in concert with the Mib indices; neither Mib index evaluation nor DeviceType evaluation is sufficient alone.

Figure 2:
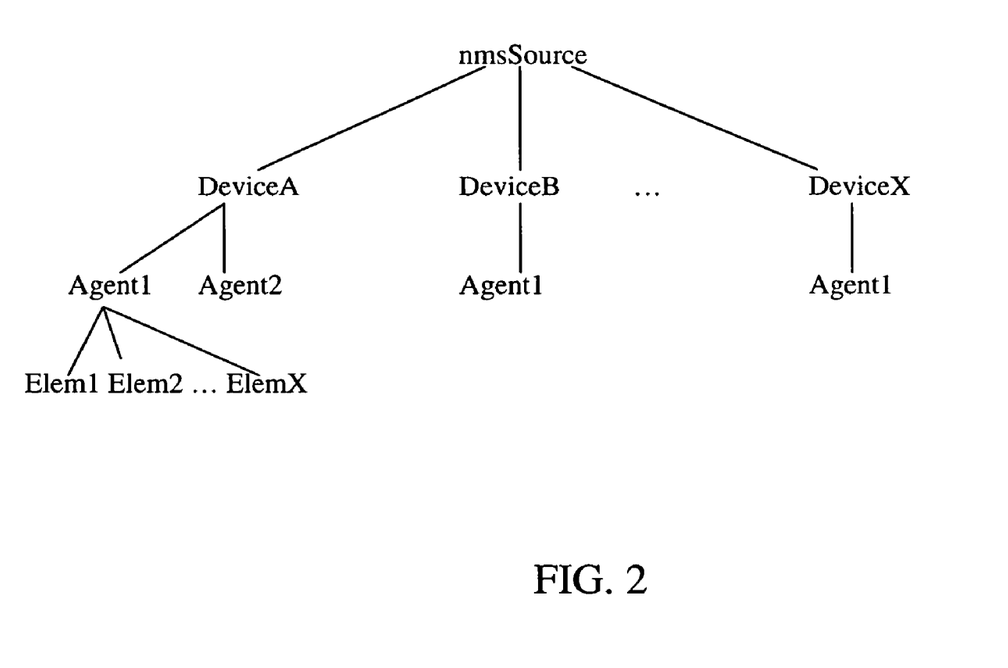
FIG. 2 is the hierarchical structure of the discovered data.

The discovery process of the described embodiment assembles network discovery data in a hierarchical structure to reduce or eliminate duplicate device records, as shown in FIG. 2. In general, the discovery process evaluates a network in several ways, i.e., from several points of view. For example, the discovery process may find a particular router in a network by looking at it specifically as on of the network routers, and it may also find that router by looking at it as a component of a LAN/WAN structure. In prior art systems, the discovery process stores the newly discovered information in a "flat" data configuration as it retrieves the data.

The described embodiment forms the discovered information gathered into the hierarchical structure of FIG. 2, consisting of a top abstract layer called nmsSource, an abstract device layer, abstract agent layer and element layer. The nmsSource is a basic division as to the source of the configuration information (i.e., the Network Management System (NMS). The nmsSource will be NH:Discover in most cases but there are other sources of configuration information that will have their own nmsSource values. The abstract device layer will be a representation of a device (the basic "box" units of the configuration, i.e., system, router, switch, etc). The device does not have to represent a discovered physical device, but is a virtual container common to elements with the same sysName, agent IP address and UniqueDeviceID. The abstract agent layer represents an agent on a device. A device can have one or more agents but in most cases there will be a single agent. What makes an agent unique within a device is the SNMP port it uses, the enterprise ID from its system table, and the MIB translation file assigned to the parent element on the agent (if such an element exists).

This hierarchical structure allows the discovery process to weed out duplicate records it produces via redundant discovery paths, because each device has a unique place in the hierarchical structure. Redundant discovery paths will lead to the same place on the structure for a given device, so that redundant records will be eliminated prior to the merge process. Further, since the hierarchical structure is also how the merge evaluation process 100 represents network elements, the hierarchical structure facilitates an efficient and accurate merge.

Other aspects, modifications, and embodiments are within the scope of the following claims.

What is claimed is:

1. A computer-implemented method of merging first information indicating previously known network elements and second information indicating newly found network elements, the method being executed by one or more computing devices that perform a plurality of operations comprising:
    defining a hierarchical structure for storing a plurality of network element attributes organized in a specific order and for evaluating whether any one of the newly found network elements is the same network element as any one of the previously known network elements using the specific order of the plurality of network element attributes stored in the hierarchical structure;
    discovering one or more first network elements and one or more second network elements based on the first information from a first network discovery operation and the second information from a second network discovery operation, each network discovery operation having discovered the plurality of network element attributes that are organized according to the specific order of the hierarchical structure, wherein the first network discovery operation is performed before the second network discovery operation such that the discovered one or more first network elements are considered previously known network elements and the discovered one or more second network elements are considered newly found network elements, and wherein the newly found network elements comprise at least one newly found network element and the previously found network elements comprise at least one previously found network element;
    arranging the newly found network elements into a first structure according to the hierarchical structure;
    arranging the previously known network elements into a second structure according to the hierarchical structure;
    comparing the first structure and the second structure based on a first one of the plurality of network element attributes;
    in response to said comparing, determining a match among the at least one newly found network element and the at least one previously known network element, wherein the match indicates that the at least one newly found network element is the same network element as the at least one previously known network element;
    evaluating the match based at least in part on a second one of the plurality of network element attributes, wherein the first one of the plurality of network element attributes is at a first position on the hierarchical structure and the second one of the plurality of network element attributes is at a second position on the hierarchical structure; and
    determining a level of confidence of the match based at least in part on the first position and the second position.

2. The computer-implemented method of claim 1, wherein the plurality of operations further comprise:
    comparing, for the match, a first address cloud that indicates a first plurality of network devices that interface with one or more first ports of the at least one newly found network element with a second address cloud that indicates a second plurality of network devices that interface with one or more second ports of the at least one previously known network element; and
    generating a number of the first plurality of network devices that are the same as the second plurality of network devices, wherein the number indicates network devices that interface with the at least one previously known network element and the at least one newly found network element, thereby providing an indication whether the at least one newly found network element is the same network element as the at least one previously known network element.

3. The computer-implemented method of claim 2, wherein the first address cloud comprises a first plurality of physical addresses and a first plurality of IP addresses of first network elements that interface with the at least one newly found network element and wherein the second address cloud comprises a second plurality of physical addresses and a second plurality of IP addresses of second network elements that interface with the at least one previously known network element, and wherein said comparing, for the match, further comprises comparing the first plurality of physical addresses and the first plurality of IP addresses with the second plurality of physical addresses and the second plurality of IP addresses.

4. The computer-implemented method of claim 1, wherein said determining the match further comprises comparing physical addresses of corresponding interface elements for the at least one newly found network element and the at least one previously known network element.

5. The computer-implemented method of claim 1, wherein said determining the match further comprises searching a configuration database to determine whether a system name associated with the at least one newly found network element matches a system name associated with the at least one previously known network element.

6. The computer-implemented method of claim 1, wherein said determining the match further comprises searching a configuration database to determine whether an IP address associated with the at least one newly found network element matches an IP address associated with the at least one previously known network element.

7. The computer-implemented method of claim 1, wherein said determining the match further comprises searching a configuration database to determine whether a unique device identification number associated with the at least one newly found network element matches a unique device identification number associated with the at least one previously known network element.

8. The computer-implemented method of claim 1, wherein said determining the match further comprises comparing NmsKey data, then comparing physical address data, then comparing Mib indices, for the at least one newly found network element and the at least one previously known network element.

9. The computer-implemented method of claim 8, wherein said comparing NmsKey data comprises searching a configuration database to determine whether the NmsKey data for the at least one newly found network element matches the NmsKey data for the at least one previously known network element.

10. The computer-implemented method of claim 8, wherein said comparing physical address data further comprises searching a configuration database to determine whether the physical address data for the at least one newly found network element matches the physical address data for the at least one previously known network element.

11. The computer-implemented method of claim 8, wherein said comparing Mib indices further comprises searching a configuration database to determine whether the Mib indices for the at least one newly found network element match the Mib indices for the at least one previously known network element.

12. The computer-implemented method of claim 1, wherein each of the newly found network elements have a unique location on the first structure, and wherein said arranging the newly found network elements into the first structure further comprises eliminating duplicate records of the newly found network elements as a result of the unique location.

13. A computer-implemented method of merging first information indicating previously known network elements and second information indicating newly found network elements, the method being executed by one or more computing devices that perform a plurality of operations comprising:
defining a hierarchical structure for storing a plurality of network element attributes organized in a specific order and for evaluating whether any one of the newly found network elements is the same network element as any one of the previously known network elements using the specific order of the plurality of network element attributes stored in the hierarchical structure;
discovering one or more first network elements and one or more second network elements based on the first information from a first network discovery operation and the second information from a second network discovery operation, each network discovery operation having discovered the plurality of network element attributes that are organized according to the specific order of the hierarchical structure, wherein the first network discovery operation is performed before the second network discovery operation such that the discovered one or more first network elements are considered previously known network elements and the discovered one or more second network elements are considered newly found network elements, and wherein the newly found network elements comprise at least, one newly found network element and the previously found network elements comprise at least one previously found network element;
determining whether attributes associated with the at least one newly found network element corresponds, at least partially, to the at least one previously known network element so as to produce a first match; and
for the first match, determining whether one or more logical links of the at least one newly found network element match corresponding network links of the at least one previously known network element, and if a second match of the one or more logical links cannot be determined, comparing physical addresses of the interface components of the at least one newly found network element to physical addresses of the interface components of the at least one previously known network element.

14. The computer-implemented method of claim 13, wherein the plurality of operations further comprise:
comparing, for the first match, a first address cloud that indicates a first plurality of network devices that interface with one or more first ports of the at least one newly found network element with a second address cloud that indicates a second plurality of network devices that interface with one or more second ports of the at least one previously known network element, so as to increase a level of confidence of the device match; and
generating a number of the first plurality of network devices that are the same as the second plurality of network devices, wherein the number indicates network devices that interface with the at least one previously known network element and the at least one newly found network element, thereby indicating that the at least one newly found network element is the same network element as the at least one previously known network element.

15. The computer-implemented method of claim 14, wherein the first address cloud comprises a first plurality of physical addresses and a first plurality of IP addresses of first network elements that interface with the at least one newly found network element and wherein the second address cloud comprises a second plurality of physical addresses and a second plurality of IP addresses of second network elements that interface with the at least one previously known network element, and wherein said comparing, for the first match, further comprises comparing the first plurality of physical addresses and the first plurality of IP addresses with the second plurality of physical addresses and the second plurality of IP addresses.

16. The computer-implemented method of claim 13, wherein the plurality of operations further comprise arranging the newly found network elements and the previously known network elements into the hierarchical structure.

17. The computer-implemented method of claim 13, wherein each of the newly found network elements have a unique location on the hierarchical structure, and wherein said arranging the newly found network elements into the hierarchical structure further comprises eliminating duplicate records of the newly found network elements as a result of the unique location.

18. A computer-implemented method of determining whether a newly found network device matches one or more devices from a list of previously known network devices, the method being executed by one or more computing devices that perform a plurality of operations comprising:
defining a hierarchical structure for storing a plurality of network element attributes organized in a specific order and for evaluating whether any one of the newly found network elements is the same network element as any one of the previously known network elements using the specific order;
discovering one or more first network elements and one or more second network elements based on first information from a first network discovery operation and second information from a second network discovery operation, each network discovery operation generating the plurality of network element attributes that are organized according to the specific order of the hierarchical structure, wherein the first network discovery operation is performed before the second network discovery operation such that the discovered one or more first network elements are considered previously known network elements and the discovered one or more second network elements are considered newly found network elements, and wherein the newly found network elements comprise at least one newly found network element and the previously found network elements comprise at least one previously found network element;

comparing one or more attributes of the at least one newly found network element to corresponding attributes of the at least one previously known network element; and in response to said comparing, if at least some of the attributes of the at least one newly found network element match the corresponding attributes of the at least one previously known network element:

comparing a first address cloud that indicates a first plurality of network devices that interface with one or more first ports of the at least one newly found network element with a second address cloud that indicates a second plurality of network devices that interface with one or more second ports of the at least one previously known network element, and generating a number of the first plurality of network devices that are the same as the second plurality of network devices, wherein the number indicates network devices that interface with the at least one previously known network element and the at least one newly found network element, thereby providing an indication whether the at least one newly found network element is the same network element as the at least one previously known network element.

19. A computer-implemented method of merging first information indicating newly found network elements and second information indicating previously known network elements, the method being executed by one or more computing devices that perform a plurality of operations comprising:

defining a hierarchical structure for storing a plurality of network element attributes organized in a specific order and for evaluating whether any one of the newly found network elements is the same network element as any one of the previously known network elements using the specific order, wherein the plurality of network element attributes are associated with identifying network elements;

discovering one or more first network elements and one or more second network elements based on the first information from a first network discovery operation and the second information from a second network discovery operation, each network discovery operation generating the plurality of network element attributes that are organized according to the specific order of the hierarchical structure, wherein the first network discovery operation is performed before the second network discovery operation such that the discovered one or more first network elements are considered previously known network elements and the discovered one or more second network elements are considered newly found network elements;

arranging the previously known network elements in a first hierarchical structure and the newly found network elements in a second hierarchical structure, wherein each of the previously known network elements have a unique place in the first hierarchical structure and each of the newly found network elements have a unique place in the second hierarchical structure;

comparing the first hierarchical structure and the second hierarchical structure by performing a top-down tree walk, wherein the comparison is based at least in part on the specific order of the plurality of network element attributes;

in response to said comparing, determining one or more compared network elements that are in the same place in the first hierarchical structure and the second hierarchical structure as being redundant; and determining whether each the one or more compared network elements are a newly found network element based at least in part on the determined redundancy.

20. The computer-implemented method of claim 3, wherein said comparing the first plurality of physical addresses and the first plurality of IP addresses further comprises determining a number of the first plurality of physical addresses and the first plurality of IP addresses that match the second plurality of physical addresses and the second plurality of IP addresses, wherein the level of confidence is enhanced based on the determined number.

21. A computer-implemented method of merging first information indicating at least one first network element found in a network during a first network discovery operation and second information indicating at least one second network element found in the network during a second network discovery operation, the method being executed by one or more computing devices that perform a plurality of operations comprising:

receiving the first information and the second information, wherein the first information comprises a first plurality of network device attributes for the at least one first network element and the second information comprises a second plurality of network device attributes for the at least one second network element;

performing a device match evaluation by comparing the first plurality of network device attributes with the second plurality of network device attributes and by generating a number of the first plurality of network device attributes that match the second plurality of network device attributes based on the comparison;

determining a first level of confidence that the at least one first network element is the same network element as the at least one second network element when the number exceeds a predetermined threshold;

determining a second level of confidence, less than the first level of confidence, that the at least one first network element is the same network element as the at least one second network element when the number is below the predetermined threshold and greater than zero; and determining a third level of confidence, less than the second level of confidence, that the at least one first network element is the same network element as the at least one second network element when the number is zero.

22. The computer-implemented method of claim 21, wherein the first information further comprises a first address cloud that indicates a first plurality of network devices that interface with one or more first ports of the at least one first network element and the second information further comprises a second address cloud that indicates a second plurality of network devices that interface with one or more second ports of the at least one second network element, the plurality of operations further comprising:

when the number is below the predetermined threshold, comparing the first address cloud with the second address cloud and generating a second number of the first plurality of network devices that are the same as the second plurality of network devices, wherein the second number indicates network devices that interface with the at least one first network element and the at least one second network element, thereby indicating that the at least one first network element is the same network element as the at least one second network element; and enhancing the second level of confidence when the second number exceeds a second predefined threshold.

23. The computer-implemented method of claim 22, wherein the first address cloud comprises a first plurality of physical addresses and a first plurality of IP addresses of the first plurality of network devices that interface with the one or more first ports of the at least one first network element, and wherein the second address cloud comprises a second plurality of physical addresses and a second plurality of IP addresses of the second plurality of network devices that interface with the one or more second ports of the at least one second network element, and wherein said comparing the first address cloud with the second address cloud further comprises comparing the first plurality of physical addresses and the first plurality of IP addresses with the second plurality of physical addresses and the second plurality of IP addresses to generate the second number.

24. The computer-implemented method of claim 22, wherein the first information further comprises a first plurality of agent attributes and the second information comprises a second plurality of agent attributes, and wherein when the second number is below the second predefined threshold the plurality of operations further comprises:

performing an agent match evaluation by comparing the first plurality of agent attributes with the second plurality of agent attributes and by generating a third number of the first plurality of agent attributes that match the second plurality of agent attributes based on the comparison; and enhancing the second level of confidence when the third number exceeds a third predefined threshold.

25. The computer-implemented method of claim 23, wherein the first information further comprises a first plurality of element attributes that indicates one or more first logical links between the at least one first network element and a first other network device and the second information comprises a second plurality of element attributes that indicates one or more second logical links between the at least one second network element and a second other network device, and wherein when the third number is below the third predefined threshold the plurality of operations further comprises:

performing an element match evaluation by comparing the first plurality of element attributes with the second plurality of element attributes and by generating a third number of the first plurality of element attributes that match the second plurality of element attributes based on the comparison, thereby indicating that the one or more first logical links share at least one common logical link with the one or more second logical links; and enhancing the second level of confidence when the at least one common logical link is shared between the one or more first logical links and the one or more second logical links.

26. The computer-implemented method of claim 21, wherein the plurality of operations further comprise:

arranging the first information into a first hierarchical structure according to a specific order and arranging the second information into a second hierarchical structure according to the specific order;

identifying a first network element at a first location in the first hierarchical structure and identifying a second network element at a second location in the second hierarchical structure, wherein the first location and the second location are at the same location according to the specific order;

determining that the second network element is a duplicate network element based on the identifying; and removing the duplicate network element from the first hierarchical structure, thereby ensuring that the first information indicates unique first network elements.

27. A computer-implemented method of discovering network elements that are newly added to a network, the method being executed by one or more computing devices that perform a plurality of operations comprising:

receiving a first address cloud that indicates a first plurality of network devices that interface with one or more first ports of at least one first network element that was discovered during a first network discovery operation and receiving a second address cloud that indicates a second plurality of network devices that interface with one or more second ports of at least one second network element discovered during a second network discovery operation;

comparing the first address cloud with the second address cloud and generating a number of the first plurality of network devices that are the same as the second plurality of network devices, wherein the number indicates network devices that interface with both the at least one first network element and the at least one second network element via the respective one or more first and second ports, thereby providing an indication whether the at least one first network element is the same network element as the at least one second network element; and determining, when the number is below a predetermined threshold, that the at least one second network element has been newly added since the first network discovery operation was performed.

28. The computer-implemented method of claim 27, wherein the first address cloud comprises a first plurality of physical addresses and a first plurality of IP addresses of the first plurality of network devices that interface with the one or more first ports of at least one first network element, and wherein the second address cloud comprises a second plurality of physical addresses and a second plurality of IP addresses of the second plurality of network devices that interface with the one or more second ports of the at least one second network element, and wherein said comparing the first address cloud with the second address cloud further comprises comparing the first plurality of physical addresses and the first plurality of IP addresses with the second plurality of physical addresses and the second plurality of IP addresses to generate the number.

29. A computer-implemented method of merging first information representing at least one first network element found in a network during a first network discovery operation and second information representing at least one second network element found in the network during a second network discovery operation, the method being executed by one or more computing devices that perform a plurality of operations comprising:

receiving, by the one or more computing devices, the first information and the second information, performing, by the one or more computing devices, a network device attribute evaluation that compares a first plurality of network device attributes of the first information with a second plurality of network device attributes of the second information to generate a number of the first plurality of network device attributes that match the second plurality of network device attributes;

when the number does not exceed a threshold number, performing, by the one or more computing devices, a network agent attribute evaluation that compares a first plurality of agent attributes of the first information with a second plurality of agent attributes of the second information to generate a second number of the first plurality of agent attributes that match the second plurality of agent attributes; and when the second number does not exceed a second threshold number, performing, by the one or more computing devices, a network element attribute evaluation that compares a first plurality of element attributes of the first information with a second plurality of element attributes of the second information to generate a second number of the first plurality of element attributes that match the second plurality of element attributes, wherein the network device evaluation is associated with a higher level of confidence as compared to the network agent evaluation.

30. The computer-implemented method of claim 29, wherein the first plurality of device attributes is selected from at least one of a system name, a unique device identifier, or an IP address.

31. The computer-implemented method of claim 29, wherein the first plurality of agent attributes is selected from at least one of an enterprise identifier, a SNMP port, or a device type.

32. The computer-implemented method of claim 29, wherein the first plurality of element attributes comprises a plurality of logical links between the at least one first network element and other network elements in the network.

* * * * *